United States Patent
Frank (10) Patent No.: US 8,818,346 B2
(45) Date of Patent: Aug. 26, 2014

(54) WIRELESS DEVICE WITH A CONTROL ENGINE USING FUNCTIONAL BLOCK PROGRAMMING

(75) Inventor: Brian S. Frank, Richmond, VA (US)

(73) Assignee: Tridium Inc., Golden Valley, MN (US)

( * ) Notice: Subject to any disclaimer, the term of this patent is extended or adjusted under 35 U.S.C. 154(b) by 1218 days.

(21) Appl. No.: 11/888,265

(22) Filed: Jul. 31, 2007

(65) Prior Publication Data
US 2009/0037938 A1    Feb. 5, 2009

(51) Int. Cl.
*H04M 3/00*    (2006.01)

(52) U.S. Cl.
USPC ........... 455/418; 455/420; 382/302; 717/169; 717/172

(58) Field of Classification Search
CPC ............ G06F 17/30979; G06F 19/325; G06F 19/3443; G06F 19/345; G06F 19/363; G06F 11/076; G06F 11/181; G06F 11/183; G06F 11/2257; G06F 11/2273; G06F 8/67
USPC .......................... 455/418; 719/320; 707/621; 717/168–178
See application file for complete search history.

(56) References Cited

U.S. PATENT DOCUMENTS

| | | | |
|---|---|---|---|
| 4,809,346 A * | 2/1989 | Shu | 382/302 |
| 5,249,270 A | 9/1993 | Stewart et al. | |
| 5,297,257 A | 3/1994 | Struger | |
| 5,398,336 A | 3/1995 | Tantry | |
| 5,550,980 A | 8/1996 | Pascucci et al. | |
| 5,598,566 A | 1/1997 | Pascucci et al. | |
| 5,718,767 A | 2/1998 | Crum et al. | |
| 5,805,442 A | 9/1998 | Crater et al. | |
| 5,862,052 A | 1/1999 | Nixon et al. | |
| 6,047,222 A | 4/2000 | Burns et al. | |
| 6,067,477 A | 5/2000 | Wewalaarachchi et al. | |
| 6,119,125 A | 9/2000 | Gloudeman et al. | |
| 6,157,943 A | 12/2000 | Meyer | |
| 6,189,109 B1 | 2/2001 | Sheikh et al. | |
| 6,370,448 B1 | 4/2002 | Eryurek | |
| 7,539,488 B2 * | 5/2009 | Friedman | 455/420 |
| 7,620,015 B2 * | 11/2009 | Lenzarini | 370/331 |
| 7,669,197 B1 * | 2/2010 | O'Neill et al. | 717/172 |
| 2003/0167320 A1 * | 9/2003 | Perez | 709/223 |
| 2006/0004895 A1 * | 1/2006 | Kim | 707/205 |

OTHER PUBLICATIONS

"Coactive: Bringing the Other Network into Focus", *VAR Business*, No. 1413, (1998), 2 pgs.
"Coupling of LonWorks and JAVA Applications", http://www.longworks.echelon.com/News/Nixdorf.html, (Nov. 5, 1998), 10 pgs.
"Echelon Joins Java Alliance to Develop Open AOU Specifications for Industrial Automation", *Business Wire*, (Oct. 7, 1996), 1-2.

(Continued)

*Primary Examiner* — Gerald Johnson
(74) *Attorney, Agent, or Firm* — Schwegman Lundberg & Woessner, P.A.

(57) ABSTRACT

Systems and methods provide for programming a wireless device for an automation system. The system and methods include specifying commands that are to be preformed regarding function blocks that may be organized into an application on a wireless device. The function blocks may be maintained in a library by a control engine on the wireless device. The control engine receives commands related to function blocks, such as instantiating function blocks from the library or linking existing function blocks. The control application formed by the function blocks may be executed on the controller to provide an automation application.

30 Claims, 5 Drawing Sheets

(56) References Cited

OTHER PUBLICATIONS

"Proceedings 1997 IEEE International Workshop on Factory Communication Systems", *IEEE International Workshop on Factory Communications Systems (WFCS '97)*, (Oct. 1, 1997), 13 pgs.

"The Open LonWorks(r) Client/Server Solution", http://www.metra.com/MNSSpecs.html, Metra Network Services, (Nov. 5, 1998), 9 pgs.

Arnold, M., "Remote Monitoring via Integration of LonWorks and World Area Network Technology", *DialogWeb*, (1997), 1 pg.

Byron, D., "A Technical Roadmap for Enterprise Connectivity to Control Networks", http://web.archive.org/web/19980519113419/www.coactive.com/media/wp9605lu.pdf, *Coactive White Papers*, Nov. 5, 1998, 1-13.

Chen, P.-W., "A Smart WWW Page Model and its Application to On-Line Information Retrieval in Hyperspace", *Proceedings of the 1996 Pacific Workshop on Distributed Multimedia Systems (DMS '96)*, (1996), 10 pgs.

Child, J., "Embedded Systems Conference Focuses on Getting The Job Done", *Electronic Design*, 55(1), (Oct. 22, 1998), 9 pgs.

Diaz-Gonzalez, J. P., et al., "Language Aspects of Envisager: An Object Oriented Environment for the Specification of Real-Time Systems", *Proceedings, International Conference on Computer Languages*, (1998), 214-225.

Gaw, D., "Scalable, Integrated, Real-Time Energy Management—Requirements and System Architecture", http://www.coative.com/pages/wp98energyman.html, *White Paper, Coactive Networks Inc.*, (Nov. 5, 1998), 9 pgs.

Kramer, J., "CONIC: An Integrated Approach to Distributed Computer Control Systems", *IEE Proceedings*, vol. 130(Part E, No. 1), (Jan. 1983), 1-10.

Nakanishi, Y., "Development of a Seamless Connection Technology Between Information Networks and Control Networks Using Java Language", *Shikoku Research Institute, Inc.*, 11 pgs.

Orihara, A., "An Autonomous Decentralized System Platform Under Multi-Vendor Enviornments in Building Automation", *Proceedings of the 3rd International Symposium on Autonomous Decentralized Systems (ISADS '97)*, (Apr. 1997), 409-415.

Paya, S., et al., "Remote Access to an Industrial Network Map 3.0 Through Internet", http://web.archive.org/web/20021204160951/http://casal.upc.es/~ieee/looking/sempere/Remote.html, Communications Department Polytechnic University of Valencia, (Nov. 5, 1998), 7 pgs.

Randazzo, M., "Controls companies see opportunities on the internet", *Energy Users News*, (Mar. 1997), 2 pgs.

\* cited by examiner

WIRELESS DEVICE WITH A CONTROL ENGINE USING FUNCTIONAL BLOCK PROGRAMMING

FIELD

Embodiments of the inventive subject matter relate generally to control engines in automation systems and more particularly to a programmable control engine on a wireless device.

BACKGROUND

Automation systems such as building automation, industrial automation and home automation systems typically are distributed systems in which many different intelligent components contribute to the operation of the system. In most cases, an automation system is unique to a job site or building, and the controllers that receive data from temperature sensors, operate switches, or manage other devices in an automation system must be programmed for a specific environment or building site.

In conventional systems, the job of programming a controller has required skilled software engineers having knowledge of the programming languages and operating environments supported by the controllers being programmed. The job of determining what the controllers are to be programmed to do has typically been performed by a domain expert, that is, a person with knowledge of the requirements and goals of a particular automation system. The domain expert typically knows the requirements of the system and communicates these requirements to the software engineers who program the controllers of a building automation system to meet the requirements. Thus in order to build a new automation system, conventional automation development environments require the skills and expertise of both a software engineer and a domain expert.

Further, conventional systems may require the skills of both a software engineer and a domain expert when changes may be desired in the operation of an existing automation system. The domain expert determines what changes may be needed and communicates the required changes in behavior of the system to the software engineers, who may then change existing controller software to meet the changed requirements.

BRIEF DESCRIPTION OF THE FIGURES

Embodiments of the invention are illustrated by way of example and not limitation in the Figures of the accompanying drawings in which.

DESCRIPTION OF THE EMBODIMENTS

Example Operating Environment

Figure 1:
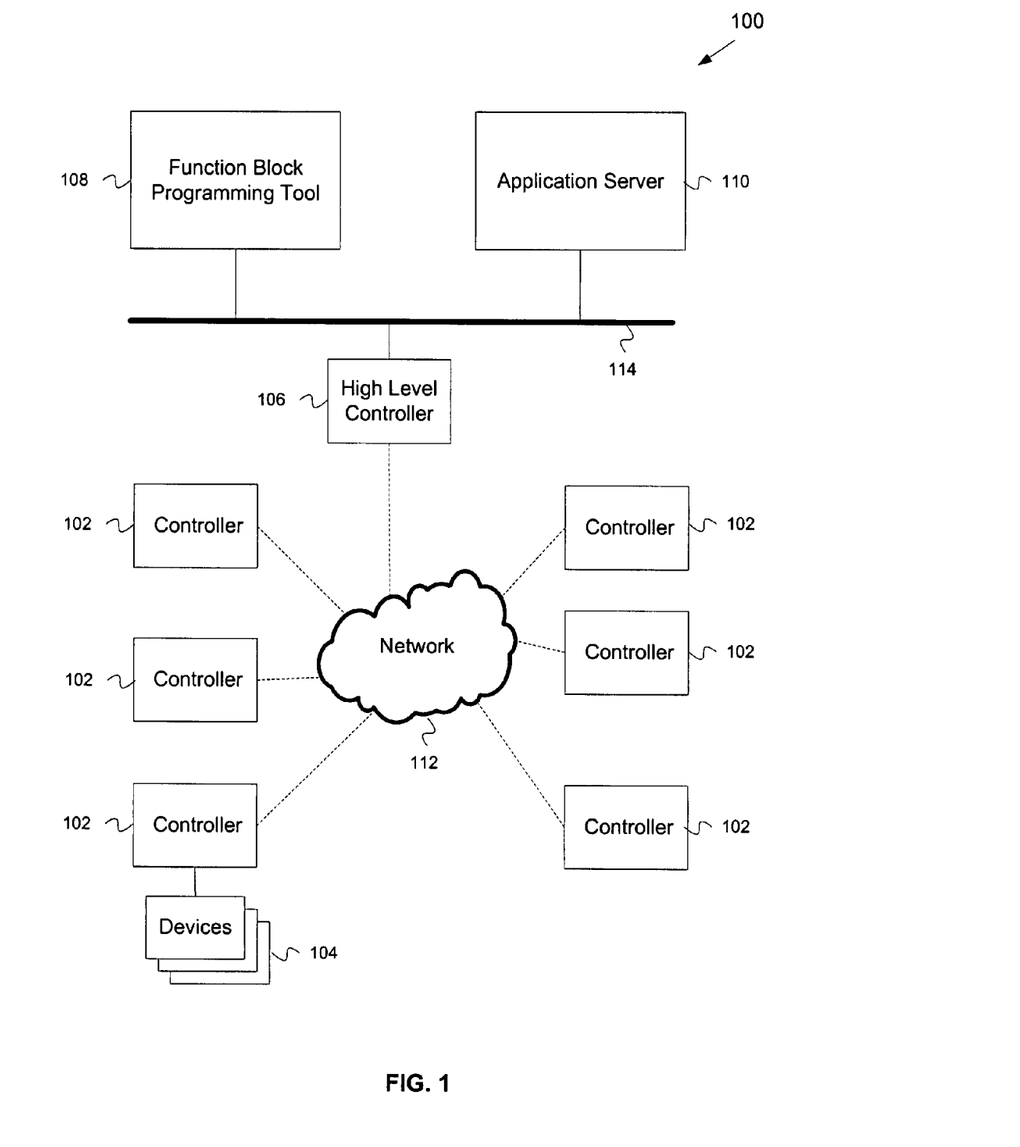
FIG. 1 is a block diagram illustrating an operating environment in which example embodiments of the invention may be practiced.

FIG. 1 is a block diagram illustrating an operating environment 100 in which example embodiments of the invention may be practiced. Environment 100 may include controllers 102, function block programming tool 108 and application server 110. These components may be communicably coupled using one or more networks 112 and 114.

Controllers 102 include hardware and software that operate to control devices 104 and that may also report data on operating conditions, alarms, or other data regarding devices 104. Devices 104 may be any of a variety of devices used in an automation system, including sensors, switches, actuators and other such devices. Further details on the hardware and software for controllers 102 are provided below with reference to FIG. 2 and FIG. 3.

Function block programming tool 108 provides an interface for specifying function blocks that may be used to program a controller 102. Further details on function blocks and function block programming tool 108 are provided below with reference to FIGS. 3 and 4.

In some embodiments, application server 110 provides one or more applications and/or stores data for an automation system. Application server may provide for the provisioning of controllers on a system and may provide a database to store data related to the controllers for an automation system. Further, application server 110 may serve as an archive or repository for log and alarm data.

In some embodiments, a controller may be a high level controller 106. In general, a high level controller 106 may have more processor and/or memory resources to enable the controller to run an automation system framework or to run applications that are not desirable to run in a standard controller 102. In some embodiments, the automation system framework may provide some or all of the functionality available on an application server 110, and/or may provide a function block programming tool 108.

Networks 112 and 114 may be used to couple the function block programming tool 108, application server 110 and controllers 102 and 106. In some embodiments, network 112 is a wireless network, and the controllers and other nodes on the network may be organized as a mesh network. A mesh network is desirable, because mesh networks are typically self-healing in that the network can still operate even when a node breaks down or a connection goes bad. As a result, a very reliable network is formed. However, other network topologies such as star or cluster tree topologies are possible and within the scope of the inventive subject matter.

In some embodiments, network 114 may be a local area network such as an Ethernet based network, a Modbus network, or an oBIX (Open Building Information Exchange) based network.

Figure 2:
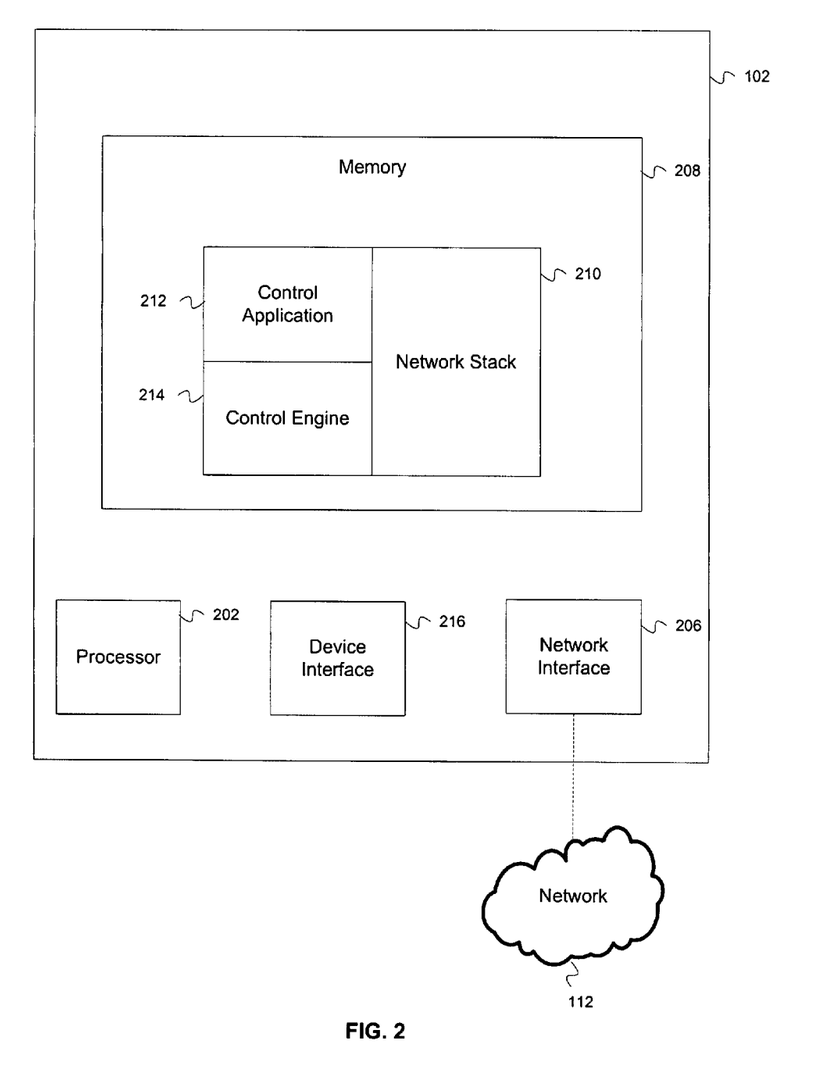
FIG. 2 is a block diagram illustrating components of a controller according to embodiments of the invention.

FIG. 2 is a block diagram providing further details and illustrating components of a controller 102 according to embodiments of the invention. In some embodiments, a controller 102 includes one or more processors 202, a memory 208 a device interface 216, and a network interface 206. Processor 202 may be any type of computational circuit such as, but not limited to, a microprocessor, a complex instruction set computing (CISC) microprocessor, a reduced instruction set computing (RISC) microprocessor, a very long instruction word (VLIW) microprocessor, a digital signal processor (DSP), or any other type of processor, processing circuit, execution unit, or computational machine, the invention are not limited to any particular type of processor. Although only one processor 202 is shown, multiple processors may be present in a controller 102.

Device interface 216 provides an interface to one or more devices 104. In some embodiments, device interface 104 may be a LonMark® fieldbus interface to LonMark devices. Alternatively, device interface 104 may be a BACnet interface to a BACnet device. Other interfaces to other types of devices are possible and within the scope of the inventive subject matter.

Network interface 206 provides an interface to network 104. Network interface 206 may be a wireless transceiver. In some embodiments, network interface 206 is a low power wireless network interface 206 and supports the Institute of Electrical and Electronics Engineers (IEEE) 802.15.4 network standard. The IEEE 802.15.4 standard is designed to provide a low data rate communications with multi-month to multi-year battery life and very low complexity. The IEEE 802.15.4 implementation is intended to operate in an unlicensed, international frequency band. Implementation of the IEEE 802.15.4 standard in a controller 102 provides for data rates sufficient for communication of automation system data while providing relatively long battery life. In general, the standard provides a CSMA-CA (carrier sense multiple access with collision avoidance) communication protocol, and additionally provides a guaranteed time slot mechanism for high priority communications.

Memory 208 stores data and programs executed by processor 202. Although shown as one unit in FIG. 2, memory 208 may include several types of memory including various combinations of RAM, ROM or Flash memory. In some embodiments, memory 208 is used to store a control engine 214, a control application 212 and a network stack 210. Control engine 214 provides software that determines which control applications resident on a controller are executed and provides an interface for customizing the control applications 212 that run on the controller. In general, the control engine software 214 may be created by a software engineer or programmer, and remains relatively static over the life of a controller and may also remain fairly static from one controller to another in the same family. In some embodiments, a controller 102 does not require an operating system and control engine 214 may be designed to include those functions normally provided by an operating system that may be required on a controller 102.

Control application 212 runs on a controller 102 and provides the customized software required for a particular automation system. Further details on a control engine 214 and control application 212 are provided below with reference to FIG. 3.

Network stack 210 provides software layers that provide an interface between the software of the control engine 214 and control application 212, and network interface 206. In some embodiments the network stack includes a physical layer that conforms to the IEEE 802.15.4 standard. The network layer may conform to the Internet Protocol (IP) V4 or V6 standards. Use of the IPV6 standard may be desirable if support for a large number of nodes in an automation system is necessary.

In some embodiments network stack 206 includes layers that conform to the ZigBee® network stack as defined by the ZigBee Alliance. The ZigBee network stack uses the MAC (Media Access and Control) and Physical layers of the 802.15.4 protocol, and provides network, security, and application framework layers that may be used to send and receive network data. ZigBee compliant network stacks may be used to handle multiple traffic types, including periodic data such as data from a sensor, intermittent data such as data from a switch, and repetitive low latency data such as alarm or security related data. Further details on the ZigBee stack may be found in "ZigBee Specification" (document 053474r13), published December, 2006 by the ZigBee Alliance, which is hereby incorporated by reference herein for all purposes.

Figure 3:
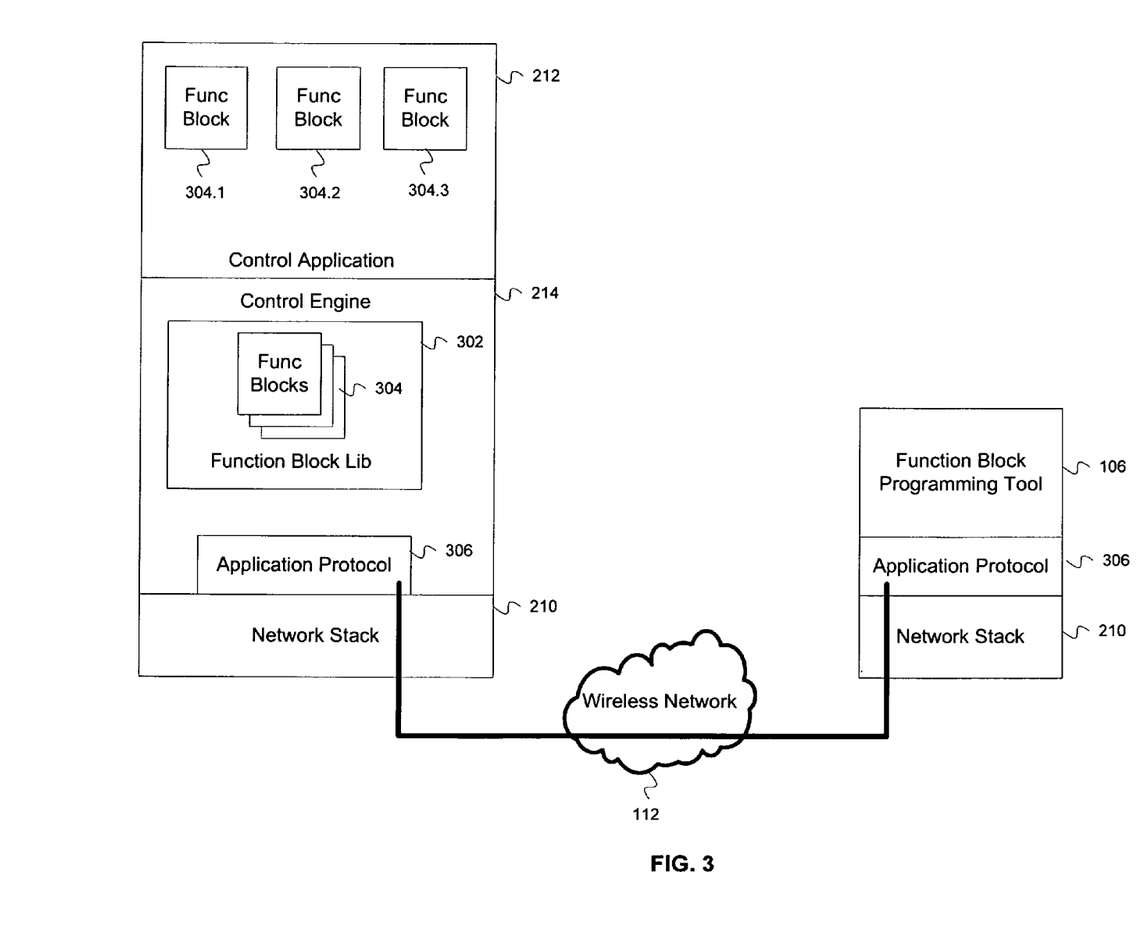
FIG. 3 is a block diagram illustrating software components of a controller according to embodiments of the invention.

FIG. 3 is a block diagram providing further details of software components for a controller and automation system according to embodiments of the invention. In some embodiments, control engine 214 maintains a library of function blocks 304. A function block 304 is a unit of execution for a control application 212. Function blocks may be instantiated and linked in a manner such that the output of one function block provides input to another function block. Individual function blocks may perform activities such as provide sensor data to another function block, provide a set point for a device, provide execution control structures such as loops, or cause a device such as an actuator or switch to operate.

Function blocks may be defined in any of a number of programming languages. For example, function blocks may be defined using the Java programming language, the C, C++ or C# programming language. In particular embodiments, function blocks and other control engine software are written in the Sedona programming language available from Tridium, Inc. of Richmond, Va. However, the embodiments are not limited to any particular programming language.

Function blocks are one component of the control engine software. In some embodiments, a function block component includes:

An identifier for identification and naming inside an application

A short ASCII character name as a human label

Reflective type

Named set of reflective slots

Slots are the members of a component class which specify how the function block is exposed to a domain expert during the assembly process. There are two types of slots: properties define configuration properties or runtime variables for the function block and actions that define a command which can be invoked for the function block.

The function blocks and other components of a control engine may be assembled into kits for deployment to controllers. A kit is a unit of deployment, versioning, and naming in some embodiments. A kit is similar to a Java JAR file or a .NET DLL.

A kit may be stored as a single file which ends with the ".kit" extension. In some embodiments, the file itself is a compressed file (for example, a PKZIP formatted file). The kit file may include an XML manifest file which specifies meta-data about the kit such as its name, version, vendor, and description. The manifest also may enumerate a kit's component types, including function blocks that are available for application assembly.

Kits may compiled using a compiler. During the compilation all the classes forming function blocks and components in the kit are checked for validity, and may be compiled into a special format called IR for "intermediate representation". The IR format is a text based "assembly language". IR code is portable which means one kit file can be deployed for multiple platforms and architectures.

The IR code of one or more kits may be further compiled into a single file referred to as a binary image file. The code in a binary image file is a compact, binary representation of the code which is designed to be loaded and executed on the control engine for a controller. In some embodiments, the control engine includes a virtual machine (VM) to interpret and execute the code in a binary image file.

After a function block has been designed and deployed, it is available for use developing automation and control systems. For example, a function block may be used by a domain expert to build applications for a controller as described below.

Function blocks may be coded such that they are intended for use with a particular device, such as function blocks that operate an actuator or read a particular type of sensor. Further, function blocks may be related to a particular domain, such as function blocks that perform calculations related to energy management. Thus in some embodiments, the function blocks are "pluggable", that is, the function blocks required for a particular automation domain or a particular set of devices may be provided in a particular function block library, and the desired function block libraries may be loaded for a control engine 214. When a function block is needed, it may be "plugged" into an existing application comprising function blocks, or a new application may be formed by "plugging" function blocks together such that the outputs of function blocks are "plugged" into the inputs of other function blocks.

In some embodiments, function blocks are maintained in library 302 until control engine 214 receives a command to instantiate a function block or function blocks. In the example illustrated in FIG. 3, three function blocks have been instantiated from library 302 to form a control application 212. Those of skill in the art will appreciate that a control application 212 may include fewer or more function blocks.

In some embodiments, a function block programming tool 106 may be used to specify commands and actions related to function blocks that reside on a particular controller 102. As noted above, function block programming tool 106 may be a standalone tool that includes the ability to specify actions related to function blocks, it may be included as part of a workbench of tools, or it may be included on a high level controller in an automation system. Function block programming tool 106 provides an interface to select function blocks and identify actions related to function blocks on a controller 102. In some embodiments, the interface may be a graphical user interface, however other interfaces may be provided, including text based interfaces. In some embodiments, the actions that may be specified for function blocks include, but are not limited to:

- Add a function block to an application (e.g. instantiate a function block from a library)
- Delete (remove) a function block from an application
- Rename a function block
- Add a link from one function block to another function block
- Remove an existing link between two function blocks
- Events—Specify function blocks to handle one or more event types that may be generated within a system or a device In some embodiments, function block programming tool 106 communicates over a network with a control engine using an application protocol 306. Application protocol 306 includes request and response messages that provide the data necessary to implement the actions listed above. In particular embodiments, the application protocol is referred to as the SOX protocol. An example of the data structures included in data packets for the SOX protocol is provided in Appendix A of this specification. In some embodiments, the SOX protocol may be implemented above the network layers of a low power wireless network such as an IEEE 802.15.4 network. In alternative embodiments, the SOX protocol may be implemented as an application layer protocol in a ZigBee network stack.

Figure 4:
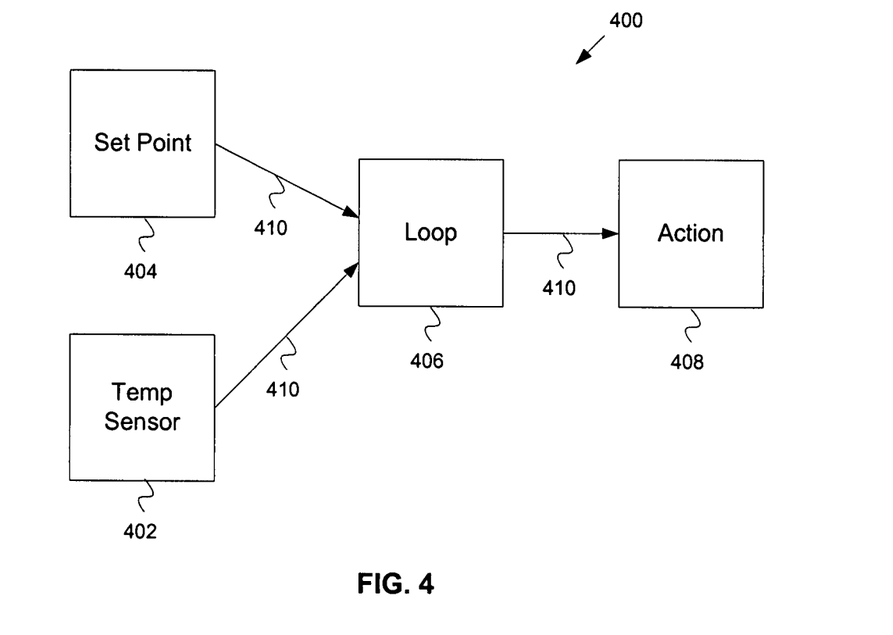
FIG. 4 shows an example arrangement of function blocks.

FIG. 4 shows an example arrangement 400 of function blocks. In the example illustrated, four function blocks 402-408 are connected via links 410 to define an example application for a control engine. Function block 402 is a temperature sensor function block. Function block 402 receives data from a temperature sensor (for example, through device interface 216) and passes the data to loop function block 406.

Function block 404 is a "Set Point" function block. Function block 404 provides data regarding a set point for the system. The set point in this example may define a temperature value threshold for use by other function blocks such as loop function block 406. The set point value for a set point function block may be static, that is constant, or it may be dynamically modifiable by a user interface associated with the set point function block.

Loop function block 406 may be defined a loop that repeatedly reads input values received from temperature sensor function block 402 and set point function block 404 and determines if the temperature value received from temperature sensor function block 402 crosses the threshold value defined by the set point function block 404. If the temperature value does cross the set point value, then loop function block 406 may provide an output value to action function block 408. Otherwise, loop function block 406 may return to the "top" of the loop to reread the set point and temperature values from function blocks 402 and 404.

Action function block 408, upon receipt of the appropriate data from loop function block 406 may send a command to a switch device or actuator device to cause the device to perform an action. For example, action block 408 may cause a heating or cooling system to activate.

In some embodiments, the data structures illustrated in Appendix A may be used to define an application for execution on a controller. For example, the "app" data structure includes fields that specify a number of components (e.g. function blocks) and an array of components that form an application, and an array of links that may be used to link the components of an application. In these embodiments, an "appComp" data structure has fields that define certain properties for a function block component of an application. The "appComp" data structure includes a numeric identifier for a function block component, however the function block component may also include a name field.

A "link" data structure may be used to define the links 410 between function block components. The "link" data structure includes fields that identify a "from" component identifier and a "to" component identifier that defines the direction of data flow. The "link" data structure also includes fields that identify slots within the "from" and "to" components that respectively provide data and receive data.

The data structures described above and others may be used in application layer messages (e.g. SOX messages) that are transmitted from a function block programming tool to a controller.

It should be noted that the example provided in FIG. 4 is but one possible arrangement of function blocks, and that many different types of function blocks may exist and may be configured into many possible combinations to form applications that are executed on a controller.

Example Operation

Figure 5:
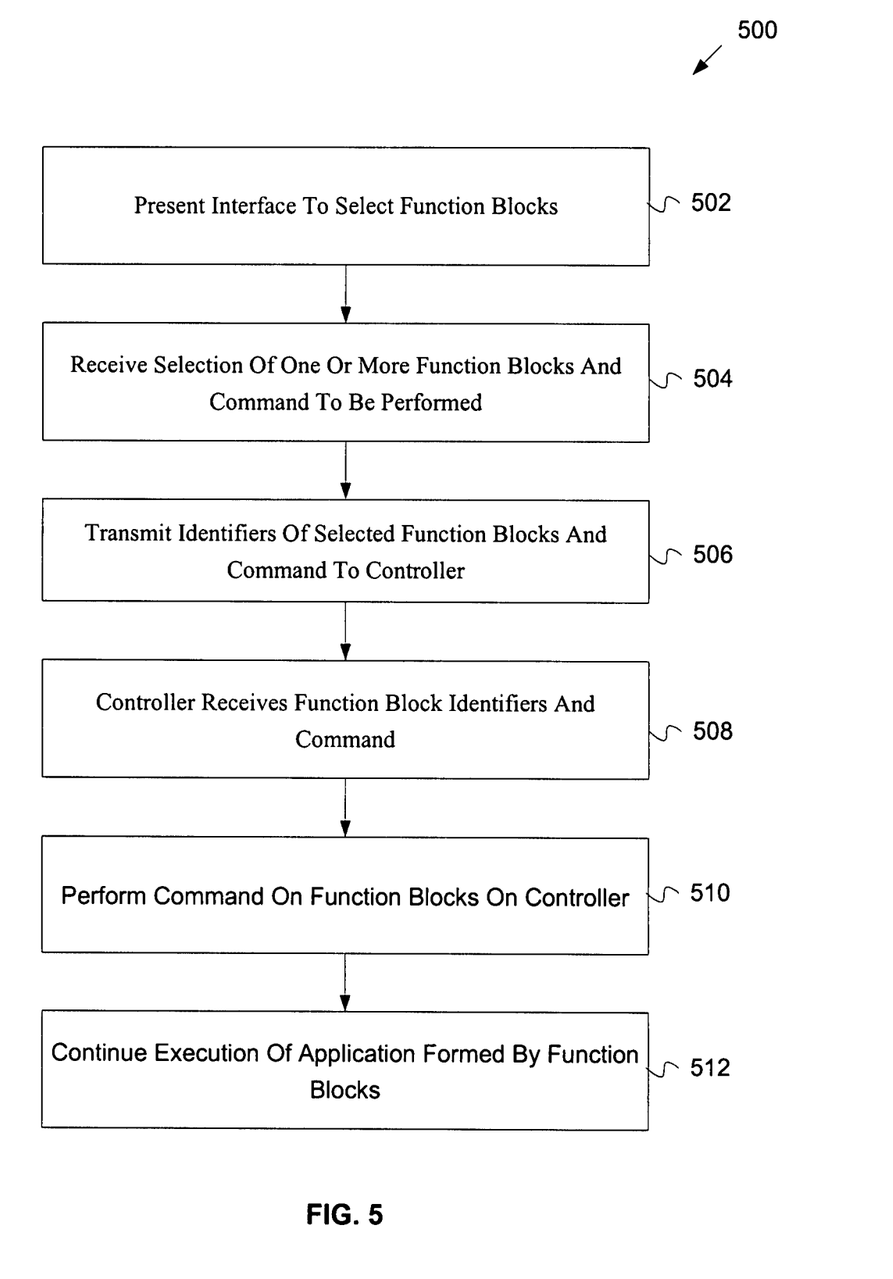
FIG. 5 is a flowchart illustrating a method for programming a controller according to embodiments of the invention.

FIG. 5 is a flowchart illustrating a method 500 for programming a controller according to embodiments of the invention. The execution of various aspects of the methods described below may be distributed through some or all of the elements of the automation system described above.

Some or all of the methods described below may be executed from a machine-readable medium. Machine-readable media includes any mechanism that provides (e.g., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

In some embodiments, method 500 begins at block 502 by presenting an interface to select one or more function blocks. The interface may be presented, for example, by a function block programming tool 106. In some embodiments, the interface may be a graphical user interface allowing a user to view and manipulate graphical objects (icons, menus etc.) that represent the function blocks of an application for a controller. Alternatively, the interface may be a text based interface.

At block 504, a system executing the method receives a selection of one or more function blocks and determines a command to be performed in relation to the one or more function blocks. As noted above, the command may be to add a function block to an application, remove a function block, link one function block to another, or unlink a function block from another function block. The command may be explicitly provided through the interface or the command may be inferred from the user's actions. For example, dragging a function block from a library of available function blocks to a window representing the current application may be used to infer an "add" command.

At block 506, identifiers associated with the one or more function blocks selected at block 504 are transmitted through a network from a system executing the function block editor to a controller, along with one or more commands to be applied to the function blocks by the controller. The identifiers may be used to identify function blocks in a function block library maintained on the controller. The function block identifiers and commands may be transmitted through a wired or wireless network. In some embodiments, the ZigBee wireless protocol stack is used as part of a wireless transmission.

At block 508, the controller receives the function block identifier(s) and command(s) through the wired or wireless network. The controller interprets the command(s) received over the network and at block 510 performs or applies the command(s) to the one or more function blocks associated with the function block identifiers received over the network.

At block 512, after performing or applying the commands, the controller continues the execution of the application as potentially modified by the command(s) and/or function block(s) received at block 508. It should be noted that in some embodiments, in continuing the execution of the application, neither the controller nor the application need be restarted, and execution of the application continues. This may be accomplished by having the control engine coordinate the modification of an application's function blocks with the interpretation of the function blocks of the application.

General

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope of the claims. The claims provided below are hereby incorporated into the detailed description, with each claim standing on its own as a separate embodiment.

APPENDIX A

```
meta
{
    str       name
    u2        parentId
    u1        numChildren
    u2[ ]     children
}
slot
{
    u1        flags
    str       name
    u1        type
}
link
{
    u2        fromCompId
    u1        fromSlotId
    u2        toCompId
    u1        toSlotId
}
links
{
    link[ ]     links
    u2          0xffff end marker
}
val
{
    bool | u1 | u2 | s4 | s8 | f4 | f8
}
**************************************************
* App
**************************************************
app
{
    u4              magic 0x73617070 "sapp"
    u4              version 0x0001 0.1
    u2              numComponents
    appComp[ ]      comps
    u2              numLinks
    link[ ]         links
}
appComp
{
    u2        id
    u2        type
    meta      meta
    val[ ]    configProps
    u1        ';' end marker
}
**************************************************
* Read
**************************************************
req
{
    u1        'r'
    u2        replyNum
    u2        compId
    u1        propId
}
res
{
    u1        'R'
    u2        replyNum
    u2        compId
    u1        propId
```

APPENDIX A-continued

```
        u1      any code ('X' for error)
        var     propValue
}
***************************************************************
* Hello
***************************************************************
req
{
        u1      'h'
        str     username
        str     password
}
res - rejection
{
        u1      'H'
        u1      'R'
        str     reason // "auth", "busy"
}
res - welcome
{
        u1      'H'
        u1      'W'
        u1      sessionId
        str     appName
}
***************************************************************
* Bye-Bye
***************************************************************
req
{
        u1      'b'
        u1      sessionId
}
res
{
        u1      'B'
}
***************************************************************
* Read Type
***************************************************************
req
{
        u1      't'
        u1      sessionId
        u2      replyNum
        u2      typeId
}
res
{
        u1      'T'
        u2      replyNum
        u2      baseTypeId
        str     name
        u1      slotCount
        slot[ ] slots
}
***************************************************************
* Read Component Meta-data
***************************************************************
req
{
        u1      'm'
        u1      sessionId
        u2      replyNum
        u2      componentId
}
res
{
        u1      'M'
        u2      replyNum
        u2      componentId
        u2      type
        meta    meta
}
***************************************************************
* Subscribe
***************************************************************
req
{
        u1      's'
```

APPENDIX A-continued

```
        u1      sessionId
        u2      replyNum
        u2      componentId
}
res
{
        u1      'S'
        u2      replyNum
        u2      componentId
        meta    meta
        val[ ]  allProps
        links   links
}
***************************************************************
* Unsubscribe
***************************************************************
req
{
        u1      'u'
        u1      sessionId
        u2      replyNum
        u2      componentId
}
res
{
        u1      'U'
        u2      replyNum
        u2      componentId
}
***************************************************************
* Post
***************************************************************
req
{
        u1      'p'
        u1      sessionId
        u2      replyNum
        u2      componentId
        u1      slotId
        val     argument
}
res
{
        u1      'P'
        u2      replyNum
}
***************************************************************
* Add
***************************************************************
req
{
        u1      'a'
        u1      sessionId
        u2      replyNum
        u2      parentId
        u2      typeId
        str     name
        val[ ]  configProps
}
res
{
        u1      'A'
        u2      replyNum
        u2      compId
}
***************************************************************
* Rename
***************************************************************
req
{
        u1      'n'
        u1      sessionId
        u2      replyNum
        u2      compId
        str     newName
}
res
{
        u1      'N'
        u2      replyNum
```

APPENDIX A-continued

```
    u2      compId
}
****************************************************************
* Delete
****************************************************************
req
{
    u1      'd'
    u1      sessionId
    u2      replyNum
    u2      compId
}
res
{
    u1      'D'
    u2      replyNum
    u2      compId
}
****************************************************************
* Link/Unlink
****************************************************************
req
{
    u1      'l'
    u1      sessionId
    u2      replyNum
    u1      'a' | 'd' (add/delete)
    link    link
}
res
{
    u1      'L'
    u2      replyNum
}
****************************************************************
* Event
****************************************************************
req - runtime event
{
    u1      'e'
    u1      sessionId
    u2      replyNum
    u2      componentId
    u1      'r' (runtime)
    val[ ]  runtimeProps
}
req - config event
{
    u1      'e'
    u1      sessionId
    u2      replyNum
    u2      componentId
    u1      'c' (config)
    meta    meta
    val[ ]  configProps
    links   links
}
res
{
    u1      'E'
    u1      sessionId
    u2      replyNum
}
```

What is claimed is:

1. A controller apparatus comprising:
at least one processor and a memory;
a low power wireless network interface coupled to the at least one processor; and
a control engine executable by the at least one processor from the memory and operable to:
receive a command and one or more identifiers specifying one or more function blocks associated with the one or more identifiers, each of the one or more function blocks comprising a unit of execution of an application executing on the controller apparatus,
perform one or more operations on the one or more function blocks in accordance with the command and the one or more identifiers, and
coordinate the operations on the one or more function blocks and interpretation of the function blocks of the application such that execution of the control engine and the application continue without restarting the control engine and the application.

2. The controller apparatus of claim 1, further comprising a network stack for the wireless interface.

3. The controller apparatus of claim 2, wherein a physical layer of the network stack conforms to an IEEE 802.15.4 interface standard.

4. The controller apparatus of claim 2, wherein a network layer of the network stack conforms to an Internet Protocol Version 6 interface standard.

5. The controller apparatus of claim 2, wherein the network stack substantially conforming to a ZigBee interface standard.

6. The controller apparatus of claim 1, wherein the command is an add command and wherein the control engine instantiates one or more function blocks in the memory.

7. The controller apparatus of claim 6, wherein the control engine is operable to maintain a function block library and wherein the one or more function blocks are instantiated from the function block library.

8. The controller apparatus of claim 1, wherein the command is a link command and wherein the control engine causes an output of a first function block to be sent to an input of a second function block.

9. A method comprising:
presenting an interface allowing selection from a plurality of function block identifiers for a control system;
receiving through the interface a selection of one or more of the plurality of function block identifiers and a command;
transmitting the selection and the command through a low power wireless interface to a controller for the control system;
determining in accordance with the selection and the command an operation to perform on one or more function blocks on the controller, the one or more function blocks comprising a unit of execution;
specifying how the one or more function blocks are exposed to a domain expert during an assembly process via a slot, wherein the slot is a member of a component class, and wherein the slot comprises a configuration property, a runtime variable, or an action that defines a command that can be invoked for the one or more function blocks; and
coordinating the operation on the one or more function blocks and interpretation of function blocks of an application such that execution of the application formed by the one or more function blocks continues without restarting the application.

10. The method of claim 9, wherein the command is an add command and wherein the command causes at least one function block to be instantiated on the controller.

11. The method of claim 10, wherein the function block is instantiated from a function block library on the controller.

12. The method of claim 9, wherein the command is a link command and wherein the command causes an output of a first function block on the controller to be sent to an input of a second function block on the controller.

13. A method comprising:
receiving by a controller a command and one or more identifiers specifying one or more function blocks associated with the one or more identifiers, each of the one or more function blocks comprising a unit of execution;

compiling the one or more function blocks into a kit comprising a single binary image file; and performing one or more operations on one or more function blocks on the controller in accordance with the command and the one or more identifiers;

wherein the one or more function blocks are included in an application executing on the controller, wherein the controller coordinates the operations on the one or more function blocks and interpretation of function blocks of the application such that the application is not restarted after performing the one or more operations on the one or more function blocks.

14. The method of claim 13, wherein the command is an add command and wherein performing one or more operations includes instantiating one or more function blocks on the controller, the one or more function blocks included in at least part of an application executing on the controller.

15. The method of claim 14, wherein the one or more function blocks are instantiated from a function block library on the controller.

16. The method of claim 13, wherein the command is a link command and wherein performing one or more operations causes an output of a first function block on the controller to be sent to an input of a second function block on the controller.

17. A system comprising:
a control engine for a controller, the control engine operable to maintain a plurality of function blocks, each of the function blocks comprising a unit of execution of an application executing on the controller;
a function block programming tool operable to:
provide an interface to select one or more identifiers associated with one or more function blocks and for selecting a command, and
transmit the command and the one or more identifiers to the control engine over a low power wireless network interface;
wherein the control engine, upon receiving the command and the one or more identifiers performs an operation related to one or more function blocks identified by the one or more identifiers in accordance with the command and coordinates the operation related to the one or more function blocks and interpretation of the function blocks of the application such that the control engine and the application are not restarted after performance of the operation related to the one or more function blocks.

18. The system of claim 17, wherein the control engine includes a network stack for the low power wireless network interface.

19. The system of claim 18, wherein a physical layer of the network stack conforms to an IEEE 802.15.4 interface standard.

20. The system of claim 18, wherein a network layer of the network stack conforms to an Internet Protocol Version 6 interface standard.

21. The system of claim 17, wherein the command is an add command and wherein the control engine instantiates one or more function blocks in the memory.

22. The system of claim 21, wherein the control engine is operable to maintain a function block library and wherein the one or more function blocks are instantiated from the function block library.

23. A non-transitory machine-readable medium having stored thereon machine-executable instructions for causing one or more processors to perform operations comprising:

presenting an interface allowing selection from a plurality of function block identifiers for a control system;

receiving through the interface a selection of one or more of the plurality of function block identifiers and a command;

transmitting the selection and the command through a low power wireless network interface to a controller for the control system;

determining in accordance with the selection and the command an operation to perform on one or more function blocks on the controller, each of the one or more function block comprising a unit of execution of an application executing on the controller; and coordinating the operation on the one or more function blocks and interpretation of function blocks of an application such that execution of the controller and the application formed by the one or more function blocks continues without restarting the controller and the application.

24. The non-transitory machine-readable medium of claim 23, wherein the command is an add command and wherein the command causes at least one function block to be instantiated on the controller, the one or more function blocks included in at least part of an application executing on the controller.

25. The non-transitory machine-readable medium of claim 24, wherein the function block is instantiated from a function block library on the controller.

26. The non-transitory machine-readable medium of claim 23, wherein the command is a delete command and wherein the command causes a function block to be removed from a set of function blocks forming an application executing on the controller.

27. A non-transitory machine-readable medium having stored thereon machine-executable instructions for causing one or more processors to perform operations comprising:
receiving by a controller a command and one or more identifiers specifying one or more function blocks associated with the one or more identifiers; and
performing one or more operations on one or more function blocks on the controller in accordance with the command and the one or more identifiers;
wherein the one or more function blocks are included in an application executing on the controller, wherein the controller is configured to coordinate the operations on the one or more function blocks and to interpret the function blocks of the application such that the controller and the application are not restarted after performing the one or more operations on the one or more function blocks.

28. The non-transitory machine-readable medium of claim 27, wherein the command is an add command and wherein performing one or more operations includes instantiating one or more function blocks on the controller, the one or more function blocks included in at least part of an application executing on the controller.

29. The non-transitory machine-readable medium of claim 28, wherein the one or more function blocks are instantiated from a function block library on the controller.

30. The non-transitory machine-readable medium of claim 27, wherein the command is a link command and wherein performing one or more operations causes an output of a first function block on the controller to be sent to an input of a second function block on the controller.

* * * * *

UNITED STATES PATENT AND TRADEMARK OFFICE
CERTIFICATE OF CORRECTION

| | | |
|---|---|---|
| PATENT NO. | : 8,818,346 B2 | Page 1 of 1 |
| APPLICATION NO. | : 11/888265 | |
| DATED | : August 26, 2014 | |
| INVENTOR(S) | : Brian S. Frank | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1343 days.

Signed and Sealed this
Fifteenth Day of December, 2015

Michelle K. Lee
*Director of the United States Patent and Trademark Office*